United States Patent
Misawa (10) Patent No.: US 7,634,179 B2
(45) Date of Patent: Dec. 15, 2009

(54) IMAGE BLURRING CORRECTING APPARATUS AND IMAGING APPARATUS

(75) Inventor: Atsushi Misawa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 597 days.

(21) Appl. No.: 11/583,091

(22) Filed: Oct. 19, 2006

(65) Prior Publication Data

US 2007/0092235 A1 Apr. 26, 2007

(30) Foreign Application Priority Data

Oct. 21, 2005 (JP) .............................. 2005-307441

(51) Int. Cl.
  *G03B 17/00* (2006.01)
(52) U.S. Cl. ...................................................... 396/55
(58) Field of Classification Search ................... 396/55; 348/208.7, 208.11; 359/554, 557
  See application file for complete search history.

(56) References Cited

U.S. PATENT DOCUMENTS 4,996,545 A * 2/1991 Enomoto et al. .............. 396/53
5,084,724 A * 1/1992 Maeno ......................... 396/55
5,883,742 A 3/1999 Kamata
7,409,150 B2 * 8/2008 Makii .......................... 396/55
2009/0135260 A1 * 5/2009 Rouvinen et al. ....... 348/208.11

FOREIGN PATENT DOCUMENTS

JP 9-80550 A 3/1997
JP 2002-350917 A 12/2002

* cited by examiner

*Primary Examiner*—W B Perkey
(74) *Attorney, Agent, or Firm*—Sughrue Mion, PLLC (57) ABSTRACT

The present invention provides an image blurring correcting apparatus comprising: a correcting optical system which corrects image blurring; a parallel link member which is arranged in parallel with an imaging optical axis and supports the correcting optical system with free parallel movement in the direction perpendicular to the imaging optical axis; and a driving force generating device with one end being fixed to a fixed part of the parallel link member and a movable end on the other end being connected to the correcting optical system, wherein the driving force generating device is driven to move the correcting optical system parallel in the direction perpendicular to the imaging optical axis by the parallel link member so as to correct the image blurring.

4 Claims, 13 Drawing Sheets

IMAGE BLURRING CORRECTING APPARATUS AND IMAGING APPARATUS

BACKGROUND OF THE INVENTION

1. Field of the Invention

The present invention relates to an image blurring correcting apparatus and an imaging apparatus, and particularly to an image blurring correcting apparatus for correcting image blurring generated by hand movement and an imaging apparatus having the image blurring correcting apparatus.

2. Description of the Related Art

An image blurring correcting apparatus is, as described in Japanese Patent Application Laid-Open No. 9-80550 for example, composed of a correcting lens for correcting image blurring, a guide member for guiding the correcting lens in the direction perpendicular to an imaging optical axis with free movement, a deflection detection sensor for detecting deflection of a camera, a voice coil motor which is an actuator of the correcting lens, or the like. This image blurring correcting apparatus drives the correcting lens by the electromagnetic force of the voice coil motor to the direction opposite to the deflection direction so as to compensate movement due to the deflection of the camera obtained by a detection output of the deflection detection sensor.

In addition, there is also known the image blurring correcting apparatus, as described in Japanese Patent Application Laid-Open No. 2002-350917, provided with a compensator lens supported movably in the direction perpendicular to an optical axis and a rocking shaft with one end supported swingably by a fixed part and the compensator lens being connected to the other end so that the rocking shaft swings to drive the compensator lens in the direction to correct the image blurring.

SUMMARY OF THE INVENTION

However, the image blurring correcting apparatus disclosed in the Japanese Patent Application Laid-Open No. 9-80550 has the problem that the voice coil motor is arranged in the side of the correcting optical system and the restrictions of the shape of the voice coil motor cause the correcting optical system and a lens barrel which accommodates the voice coil motor to be large-sized and flat shape, resulting in the lens barrel being unable to be miniaturized.

In addition, the image blurring correcting apparatus disclosed in the Japanese Patent Application Laid-Open 2002-350917 has the problem that the compensator lens is inclined with respect to the imaging optical axis due to the swing of the rocking shaft, which requires to dispose a dedicated mechanism for compensating the inclination at a support part of the rocking shaft or a connection part of the rocking shaft and the compensator lens in order to solve the problem, resulting in the complexity of the mechanism and the difficulty in manufacturing.

The present invention is made in view of such a situation and an object thereof is to provide an image blurring correcting apparatus which can miniaturize the lens barrel with a simple structure and the imaging apparatus provided with the image blurring correcting apparatus.

In order to accomplish the foregoing object, an image blurring correcting apparatus according to a first aspect comprising: a correcting optical system which corrects image blurring; a parallel link member which is arranged in parallel with an imaging optical axis and supports the correcting optical system with free parallel movement in the direction perpendicular to the imaging optical axis; and a driving force generating device with one end being fixed to a fixed part of the parallel link member and a movable end on the other end being connected to the correcting optical system, wherein the driving force generating device is driven to move the correcting optical system parallel in the direction perpendicular to the imaging optical axis by the parallel link member so as to correct the image blurring.

According to the image blurring correcting apparatus of the first aspect, the correcting optical system is supported with free parallel movement in the direction perpendicular to the imaging optical axis by the parallel link member arranged in parallel with the imaging optical axis, and the driving force generating device with one end being fixed to the fixed part of the parallel link member and the movable end on the other end being connected to the correcting optical system moves the correcting optical system parallel in the direction perpendicular to the imaging optical axis by the parallel link member so as to correct the image blurring. In other words, the image blurring correcting apparatus of the present invention is able to support the correcting optical system in the direction perpendicular to the imaging optical axis with the simple structure by supporting the correcting optical system with the parallel link member, and to prevent an optical axis of the moved correcting optical system being inclined with respect to the imaging optical axis by an effect of the parallel link member. In addition, since the parallel link member and the driving force generating device are disposed in the direction of the imaging optical axis, an area of a plane in the direction perpendicular to the imaging optical axis becomes small, and thereby the lens barrel becomes small.

A second aspect of the present invention is characterized by the driving force generating device in the first aspect being a bimorph piezoelectric actuator.

According to the second aspect, the bimorph piezoelectric actuator constituted by pasting thin sheets of piezoelectric ceramics together via a metal plate of an electrode or directly is applied as the driving force generating device. A voltage is applied to the bimorph piezoelectric actuator to provide a potential, and resulting piezoelectric transversal effect is used to expand one of the two thin sheets and contract the other to obtain bending displacement, which causes the correcting optical system to move in the direction to correct the image blurring. Since the bimorph piezoelectric actuator is in a sheet form and disposed along the imaging optical axis, a disposition space in the lens barrel is reduced and can contribute to the miniaturization of the lens barrel. In addition, since the bimorph piezoelectric actuator is superior to other actuators in terms of displacement precision, generative force, and a speed of response, it is suitable as an actuator of the image blurring correcting apparatus which requires high precision and quick response.

A third aspect of the present invention provides an imaging apparatus provided with the image blurring correcting apparatus of the first or second aspects.

According to the imaging apparatus of the third aspect, which has the image blurring correcting apparatus with a simple structure and the miniaturized lens barrel, the whole imaging apparatus can be miniaturized.

According to the present invention, since the correcting optical system is supported with free parallel movement in the direction perpendicular to the imaging optical axis by the parallel link member arranged in parallel with the imaging optical axis, and the driving force generating device with one end being fixed to the fixed part of the parallel link member and the movable end on the other end being connected to the correcting optical system moves the correcting optical system parallel in the direction perpendicular to the imaging optical axis by the parallel link member so as to correct the image blurring, there can be provided the image blurring correcting apparatus which can miniaturize the lens barrel with a simple structure as well as the imaging apparatus provided with the image blurring correcting apparatus.

DETAILED DESCRIPTION OF THE PREFERRED EMBODIMENTS

Hereinafter, preferred embodiments of an image blurring correcting apparatus and an imaging apparatus according to the present invention will be described in accordance with the drawings.

Although the following description describes an example where the imaging apparatus of the present invention is applied to a digital camera 10 provided with a bending optical system, the present invention is not limited thereto and can be applied to the common digital camera which has an imaging optical axis in the width direction of the body of the imaging apparatus and a camera-equipped cell phone having a camera function.

Figure 1:
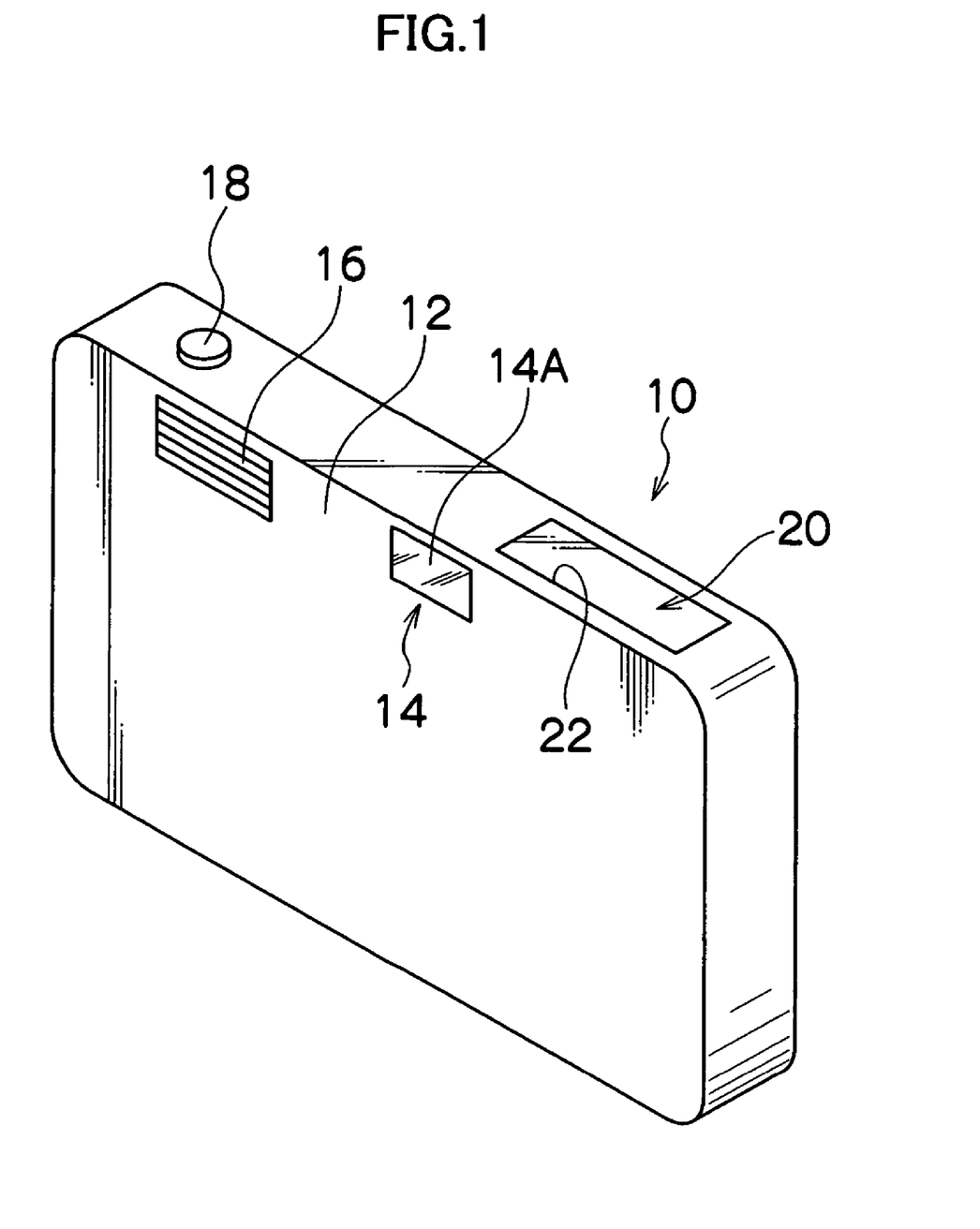
FIG. 1 is a front perspective view of a digital camera of an embodiment.
Figure 2:
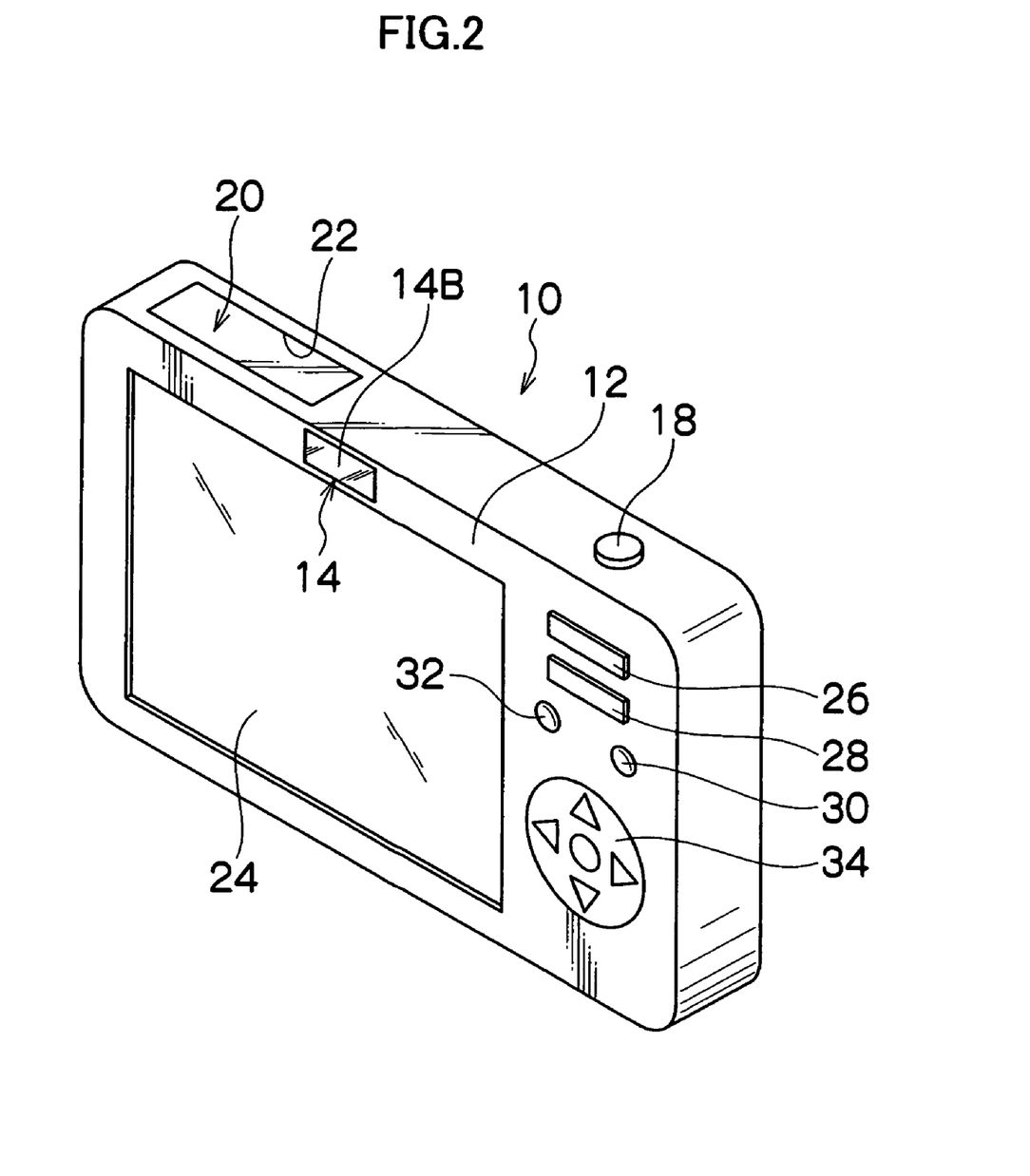
FIG. 2 is a rear perspective view of the digital camera illustrated in FIG. 1.
Figure 3:
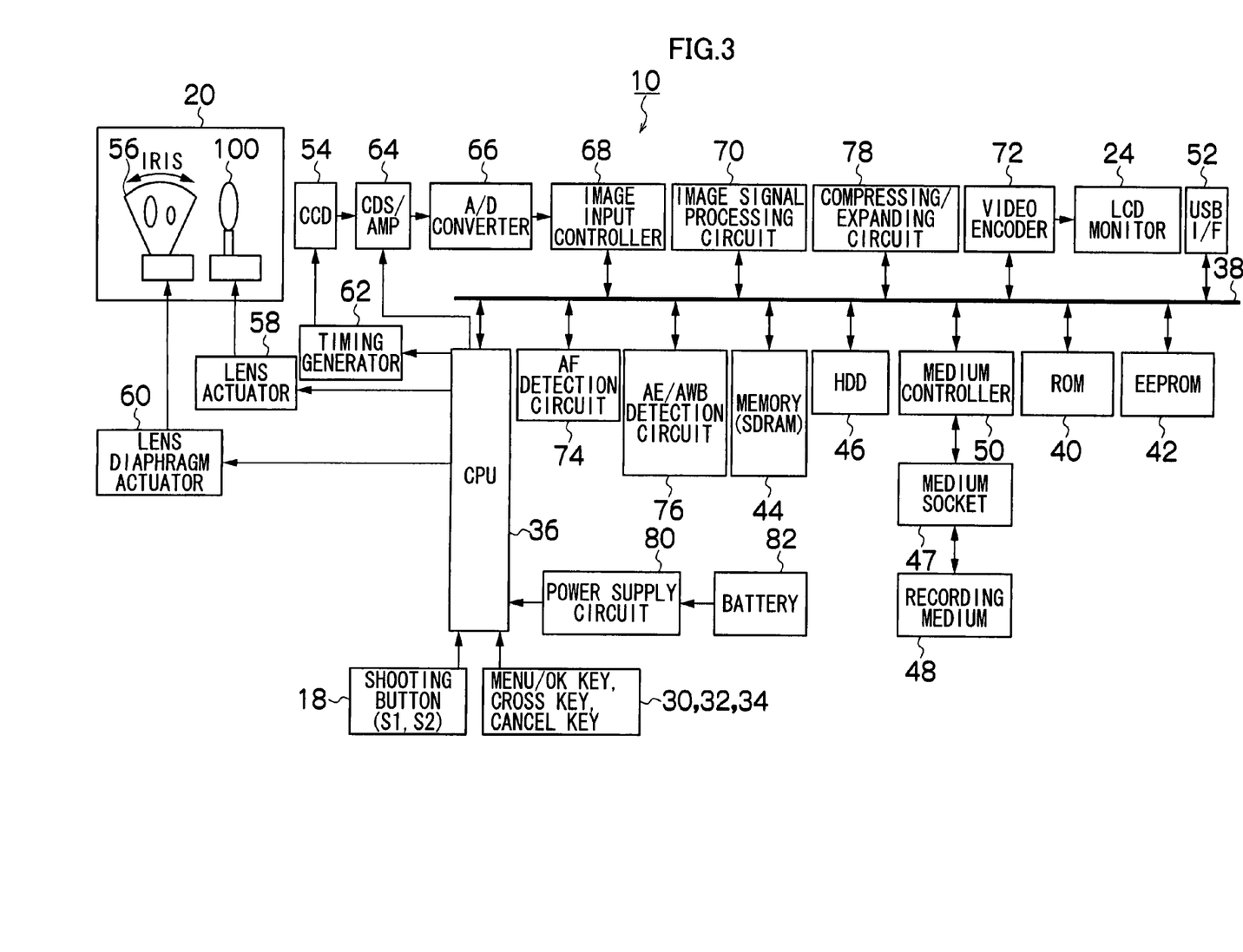
FIG. 3 is a block diagram illustrating a configuration of the digital camera illustrated in FIG. 1.

FIG. 1 is a front perspective view of the digital camera 10 of an embodiment, and FIG. 2 is a rear perspective view of the digital camera 10. FIG. 3 is a block diagram illustrating a whole configuration of the digital camera 10.

As illustrated in FIGS. 1 and 2, a camera case 12 of the digital camera 10 assumes the thin and flat appearance of a substantially rectangular parallelepiped shape in the width direction with a horizontally long shape wherein the size of the width direction of the camera case 12 is longer than the height direction thereof. The bending optical system and an image sensor are accommodated in the camera case 12.

As illustrated in FIG. 1, an object window 14A of an optical finder 14 and a stroboscope luminescent section 16 having a xenon pipe are disposed on the upper part of the front face of the camera case 12 side by side, and a shooting button 18 is arranged on the top face of the camera case 12. The shooting button 18 is halfway pressed and fully pressed by an index finger of a right hand of a user who grasps the camera case 12. Focus adjustment is performed at the time of the half-press operation, and the full-press operation is carried out thereafter so that an image of an object is formed on the image sensor via the bending optical system which is described later. In addition, an opening 22 in a rectangular shape through which a lens barrel 20 holding the bending optical system is taken in and out is formed on the top face of the camera case 12.

Meanwhile, on the rear face of the camera case 12, a liquid crystal display monitor 24, a power switch 26, a mode selection switch 28, a menu/OK key 30, a cancel key 32, a cross key 34, and an eyepiece window 14B of the optical finder 14 are disposed at the predetermined positions, respectively, as illustrated in FIG. 2. The power switch 26 is operated in order to direct start and stop of the operation of the whole digital camera 10, i.e., the start and stop of supplying power from a power supply. The mode selection switch 28 is a switch for selecting one mode among a camera mode which shoots a still image, an animation mode which shoots an animation, and a reproduction mode which reproduces the image recorded on a recording medium, and the image based on the selected mode is displayed on the liquid crystal display monitor 24. The menu/OK key 30 is an operation key having both a function as a menu button for instructing to display a menu on the screen of the liquid crystal display monitor 24 and a function as an OK button for instructing determination, execution, or the like of a selected content. The cancel key 32 is used, for example, when deleting a desired target such as a selected item, canceling an instructed content, or making it return to the previous operating condition. The cross key 34 is disposed to be tilted freely in the vertical and horizontal directions, and used as the operation key for instructing selection of various setting items in setting such as the mode, change in setting contents, or deletion of recorded images, as well as the operation key for instructing adjustment of zoom or frame advance/reverse at the time of reproduction.

The overall operation of the digital camera 10 is controlled by a central processing unit (CPU) 36 as illustrated in FIG. 3. The CPU 36 functions as a control device for controlling a camera system in accordance with a predetermined program, while functions as a computing device for performing various computations, such as automatic exposure (AE) computation, automatic-focusing (AF) computation, and white balance (WB) adjustment computation.

A ROM 40 connected with the CPU 36 via a bus 38 stores a program executed by the CPU 36 and various data required for the control, and an EEPROM 42 stores CCD pixel defect information, various constants/information regarding camera operation, or the like.

In addition, a memory (SDRAM) 44 is used as an expansion area of the program and a computation working area of the CPU 36 while being used as temporary storage of image data or voice data. A recording section (HDD) 46 is a temporary storage memory dedicated for the image data, and can be deleted by operating the cross key 34 of the digital camera 10.

The shooting button 18 is an operation button for inputting the instruction to start shooting, and constituted of a two-step stroke type switch having an S1 switch set to ON when halfway pressed and an S2 switch set to ON when fully pressed.

The liquid crystal display monitor 24 is also used as the display screen for a user interface, and the information including menu information, selection items, and the setting contents, is displayed if needed. Moreover, the image data recorded on the recording section 46 is reduced in size and thumbnailed on the liquid crystal display monitor 24. Although the liquid crystal display monitor 24 is a liquid crystal display, it can be replaced with other types of the display such as an organic electroluminescence display.

The digital camera 10 has a medium socket 47, to which a recording medium 48 is mounted. The form of the recording medium is not particularly limited, but can use various media, including a semiconductor memory card represented by SmartMedia (trademark), a portable small hard disk, a magnetic disk, an optical disk, and a magneto-optic disk.

A medium controller 50 performs necessary signal transformation in order to deliver an input/output signal suitable for the recording medium 48 mounted to the medium socket 47.

In addition, the digital camera 10 is provided with a USB interface section 52 as a communication device for connecting with a personal computer or other external instruments. The external instrument is connected to a connector as a communication terminal connected to the USB interface section 52 via a non-illustrated USB cable, allowing delivery of the data such as the image data with the external instrument. Apparently, a communication mode is not limited to the UBS and other communication modes may be applied.

Next, the shooting function of the digital camera 10 is described.

If the camera mode or the animation mode is selected by the mode selection switch 28, the power is supplied to an imaging section containing a color CCD solid state image sensor (hereinafter, the CCD) 54, so that the shooting is enabled.

The lens barrel 20 is an optical unit containing a taking lens group 100 having the bending optical system and a mechanical shutter 56 combined with lens diaphragms. The lens barrel 20 is electrically driven by a lens actuator 58 and a lens diaphragm actuator 60 which are controlled by the CPU 36 to perform zoom control, focus control, and iris control.

Light which passed the taking lens group 100 forms the image on a light-receiving surface of the CCD 54. A number of photodiodes (light receiving elements) are arranged two-dimensionally on the light-receiving surface of the CCD 54, and red (R), green (G), and blue (B) primary color filters are arranged with a predetermined array structure corresponding to the respective photodiodes. In addition, the CCD 54 has an electronic shutter function which controls charge storage time (shutter speed) of the respective photodiodes. The CPU 36 controls the charge storage time at the CCD 54 via a timing generator 62. Note that other types of the image sensor, such as a MOS type, may be used instead of the CCD 54.

An object image formed on the light-receiving surface of the CCD 54 is transferred into a signal charge of an amount corresponding to an incident light amount by the respective photodiodes. The signal charge accumulated in the respective photodiodes is read sequentially as a voltage signal (image signal) corresponding to the signal charge based on a driving pulse provided from the timing generator 62 in accordance with an instruction by the CPU 36.

The signal output from the CCD 54 is sent to an analog processing section (CDS/AMP) 64, in which the sample hold (correlation double sampling processing) of R, G, and B signals for every pixel is carried out and added to an A/D converter 66 after being amplified. The point sequential R, G, and B signals transferred into digital signals by the A/D converter 66 are stored in the memory 44 via an image input controller 68.

An image signal processing circuit 70 processes the R, G, and B signals stored in the memory 44 in accordance with the instruction by the CPU 36. In other words, the image signal processing circuit 70 functions as an image processing device including such as a synchronization circuit (processing circuit which interpolates a spatial gap of the color signal associated with the color filter array of a single-plate CCD to transfer the color signal simultaneously), a white balance correction circuit, a gamma correction circuit, an outline correction circuit, and a luminance/color-difference signal generating circuit, to perform predetermined signal processing utilizing the memory 44 in accordance with a command from the CPU 36.

The RGB image data input into the image signal processing circuit 70 is transferred into the luminance signal and the color-difference signal in the image signal processing circuit 70, while a predetermined processing such as gamma correction being performed. The image data processed in the image signal processing circuit 70 is recorded on the recording section 46.

When carrying out the monitor output of the taken image to the liquid crystal display monitor 24, the image data is read from the data recording section 46 and sent to a video encoder 72 via the bus 38. The video encoder 72 transfers the input image data into the signal of a predetermined method for display (for example, an NTSC color composite video signal) and outputs the signal to the liquid crystal display monitor 24.

If the shooting button 18 is halfway pressed and S1 is set to ON, the digital camera 10 starts AE and AF processing. In other words, the image signal output from the CCD 54 is input into an AF detection circuit 74 and an AE/AWB detection circuit 76 via the image input controller 68 after A/D conversion.

The AE/AWB detection circuit 76 includes a circuit which divides one screen into a plurality of areas (for example, 16×16) and integrates the RGB signals per the divided area and provides the CPU 36 with the integrated value. The CPU 36 detects the brightness of the object (object luminance) based on the integrated value acquired from the AE/AWB detection circuit 76 and calculates an exposure value (imaging EV value) suitable for the imaging. A lens diaphragm value and a shutter speed are determined in accordance with the calculated exposure value and a predetermined program diagram, and the CPU 36 controls the electronic shutter and iris of the CCD 54 in accordance therewith to obtain proper light exposure.

Moreover, the AE/AWB detection circuit 76 calculates an average integrated value for the respective colors of the RGB signals per divided area at the time of automatic white balance adjustment and provides the CPU 36 with the calculated result. The CPU 36 acquires the integrated values of R, B, and G, respectively to acquire the ratio of R/G and B/G per divided area, determines the type of the light source based on such as distribution of these R/G and B/G values in color spaces of R/G and B/G. Based on a white valance adjustment value suitable for the determined type of the color source, the CPU 36 controls a gain value (white balance correction value) for R, G, and B signals of a white valance adjustment circuit, so that the respective ratio values are approximately 1 for example, to correct the signals of respective color channels. When the gain value of the white valance adjustment circuit is adjusted so that the respective ratio values are other than 1, the image in which a certain color remained can be generated.

As for the AF control in the digital camera 10, contrast AF in which a focusing lens (mobile lens which contributes to focus adjustment among a lens optical system constituting the taking lens group 100) is moved so that a high frequency component of the G signal of the video signal becomes the maximum, for example, is applied. In other words, the AF detection circuit 74 includes a high-pass filter which passes only the high frequency component of the G signal, an absolute value processing section, an AF area extraction section which clips the signal in a focal target area set up preliminarily in the screen (for example, center of the screen), and an integration section which integrates absolute value data in an AF area.

The data of the integrated value acquired by the AF detection circuit 74 is reported to the CPU 36. The CPU 36 controls the lens actuator 58 to move the focusing lens, while computing a focal evaluation value (AF evaluation value) on a plurality of AF detection points to determine a lens position where the evaluation value becomes the maximum as a focus position. Then, the lens actuator 58 is controlled to move the focusing lens to the acquired focus position. The computation of the AF evaluation value is not limited to the aspect utilizing the G signal, but a luminance signal (Y signal) may be utilized.

The shooting button 18 is halfway pressed and S1 is set to ON so that the AE/AF processing is performed, while the shooting button 18 is fully pressed and S2 is set to ON so that the imaging operation for recording is started. The image data acquired in response to S2 being set to ON is transferred into the luminance/color-difference signal (Y/C signal) in the image signal processing circuit 70, and stored in the memory 44 after predetermined processing such as the gamma control is performed.

The Y/C signal stored in the memory 44 is compressed by a compressing/expanding circuit 78 in accordance with a predetermined format, and then recorded on the recording medium 48 via the medium controller 50. For example, the still image is recorded in the JPEG format.

When the reproduction mode is selected by the mode selection switch 28, the compressed data of the last image file recorded on the recording medium 48 (file recorded at the last) is read. When the file regarding the last record is a still image file, the read image compressed data is, after being expanded to the non-compressed YC signal via the compressing/expanding circuit 78 and transferred into the signal for display via the image signal processing circuit 70 and the video encoder 72, output to the liquid crystal display monitor 24. Thereby, the image content of the file is displayed on the screen of the liquid crystal display monitor 24.

During reproduction of one frame of the still image (including during reproduction of a head frame of the animation), the file of the reproduction target can be switched by operating the right key or left key of the cross key 34 (forward frame advance/reverse frame advance). The image file at the position of the frame being advanced is read from the recording medium 48, and the still image or the animation is reproduced on the liquid crystal display monitor 24 similarly as above. Note that the digital camera 10 is driven with the power of a battery 82 supplied via a power supply circuit 80.

In addition, the digital camera 10 is provided with a connector (not illustrated) disposed on the bottom face of the camera case 12 for charging the battery 82 which is a secondary battery. Moreover, a connector (not illustrated) for transmitting the image data stored in the recording section 46 to other devices is also disposed on the bottom face of the camera case 12. The above is the whole configuration of the camera 10.

Figure 4:
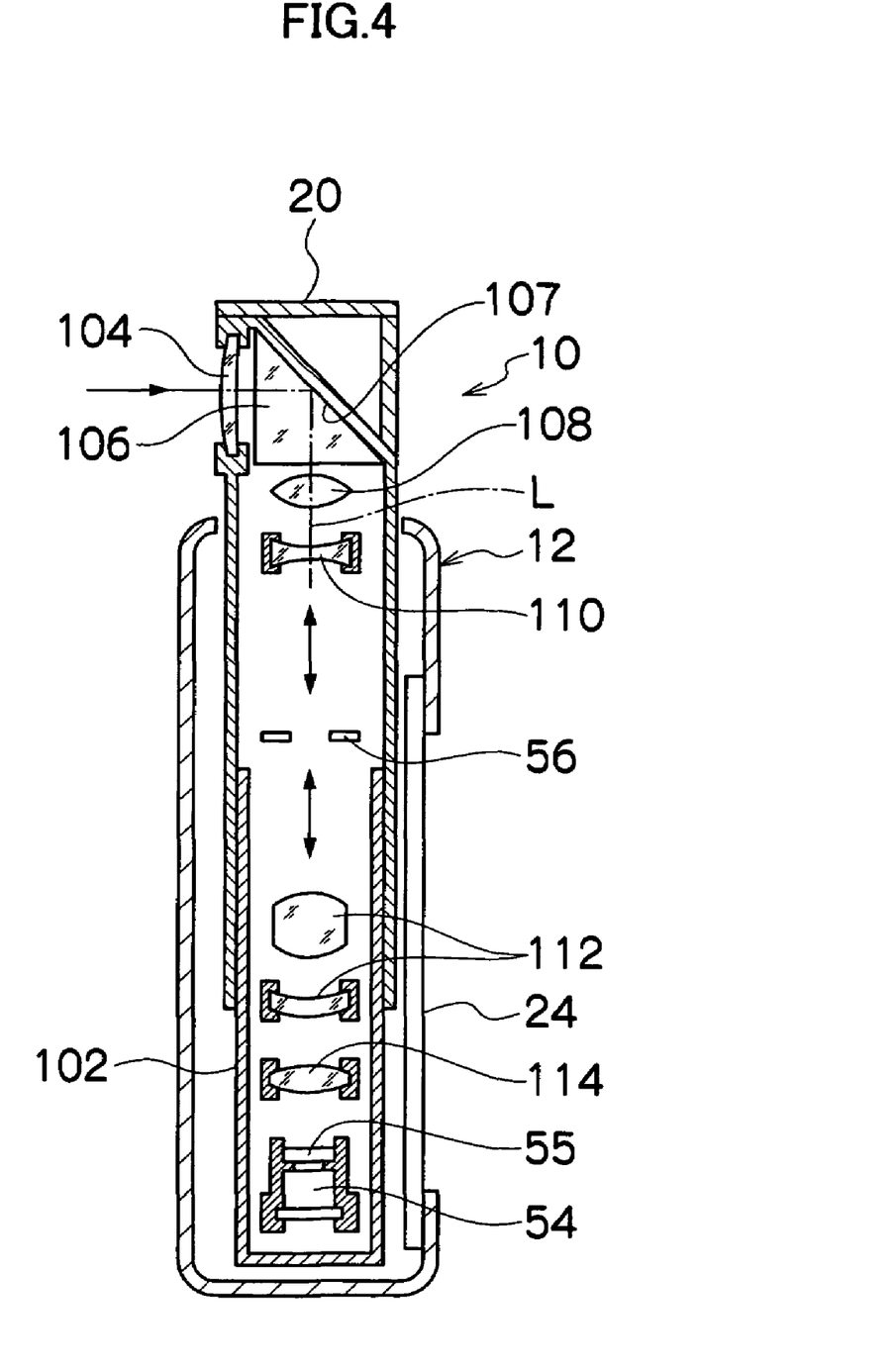
FIG. 4 is a vertical cross sectional view of an optical system of the digital camera in use illustrated in FIG. 1.
Figure 5:
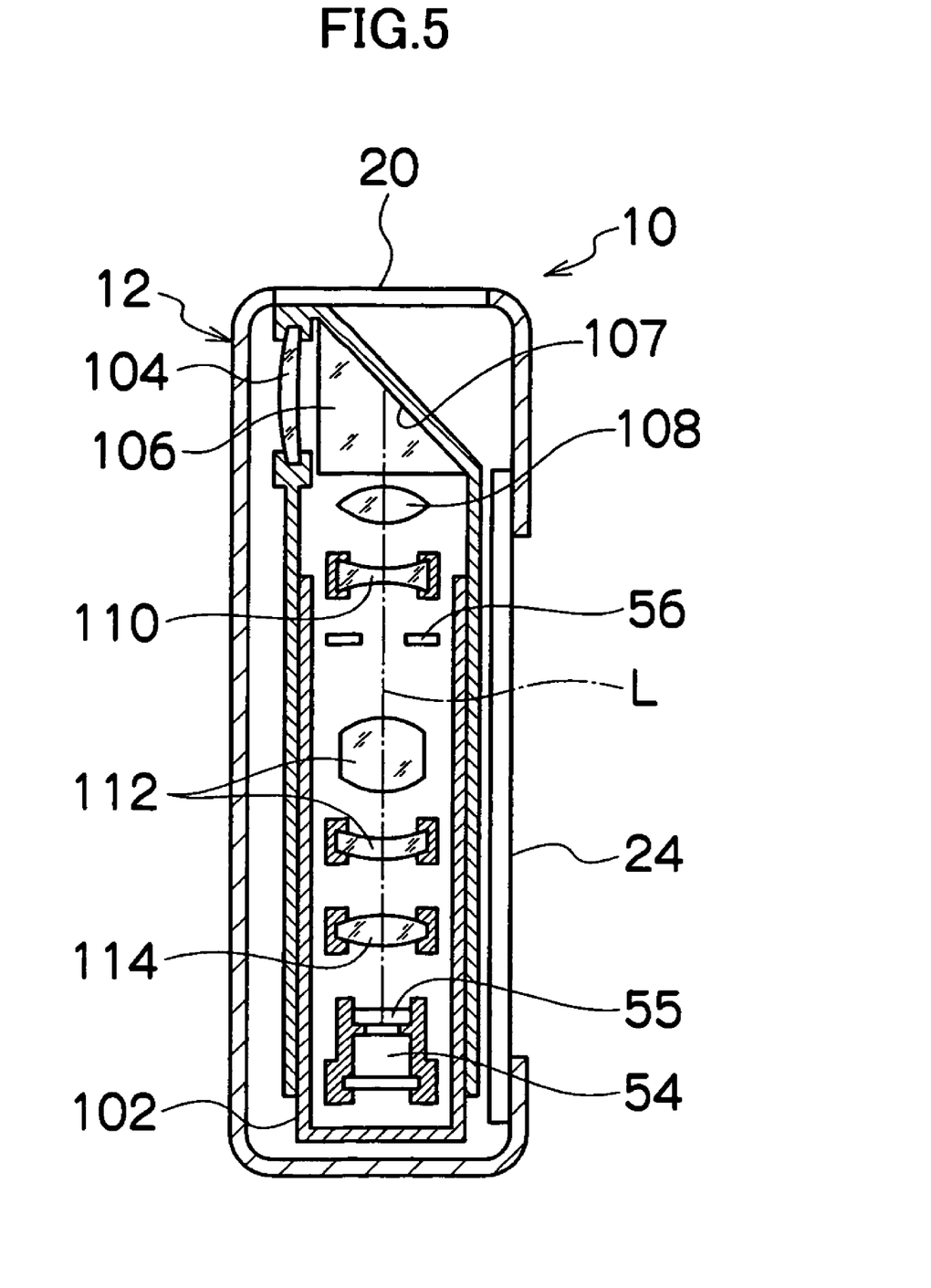
FIG. 5 is a vertical cross sectional view of the optical system of the digital camera not in use illustrated in FIG. 1.

FIGS. 4 and 5 are cross sectional views illustrating a configuration of the taking lens group 100 of the digital camera 10, wherein FIG. 4 is the cross sectional view where the telescopic lens barrel 20 is extended upward with respect to a fixed lens barrel 102 and an entrance window 104 projects outward from the top face of the camera case 12 to be located in a use position, while FIG. 5 is the cross sectional view where the lens barrel 20 is contracted downward with respect to the fixed lens barrel 102 and the entrance window 104 is completely contained in the camera case 12 to be located in an non-use position. Note that the entrance window 104 may be a transparent plate which penetrates only the light or may be the lens. The width of the extended lens barrel 20, which is in the direction along the long side of the digital camera 10, is substantially equal to the size in a longitudinal direction of the opening 22 on the top face of the camera case 12 so that the lens barrel 20 is taken in and out through the opening 22. The entrance window 104 is provided on the lens barrel 20 in any of the center, the left side or the right side on the lens barrel 20 in the longitudinal direction of the digital camera 10. Moreover, as shown in FIG. 4, the entrance window 104 is provided on the front face of the digital camera 10.

The taking lens group 100 illustrated in these drawings is an imaging optical system to form the image by guiding the light from the object to the CCD 54. The imaging optical system includes the entrance window 104 which takes in the light from the object, a bending optical system 106 which bends an optical path entered from the entrance window 104 in the substantially perpendicular direction, a front lens 108, zoom optical system lenses 110 and 112, the mechanical shutter combined with lens diaphragms 56, and a relay lens 114. The relay lens 114 is the correcting optical system which corrects the image blurring, which is supported by a parallel linkage mechanism (parallel link member) described later and driven in the direction to correct the image blurring by the bimorph piezoelectric actuator (driving force generating device).

The bending optical system 106 is arranged to face the entrance window 104 and to bend the optical path entered from the entrance window 104 downward by 90 degrees. Although a rectangular prism with a reflective surface 107 on an inclined surface is used as the bending optical system 106, it is not limited to the rectangular prism but other optical elements such as a simple mirror which can bend the optical path of the light may be applied. Note that reference numeral 55 designates a cover glass which protects an imaging surface of the CCD 54.

The zoom optical system lenses 110 and 112 are arranged between the bending optical system 106 and the CCD 54, so that an imaging optical axis L thereof passes through the center of the reflective surface 107 of the bending optical system 106 and is angled by 45 degrees with respect to the reflective surface 107 while passing through the center of the CCD 54 and being perpendicular to the imaging surface of the CCD 54. The lens barrel 20 is expanded and contracted along the imaging optical axis L of the zoom optical system lenses 110 and 112.

The zoom optical system lenses 110 and 112 are constituted of a zoom lens group 110 for changing magnifying power of the imaging and a focal lens group 112 for focal control, which are, in the use position of FIG. 4, disposed in the position to acquire a predetermined magnifying power of the imaging (for example, optical 3× zoom) by the zoom lens group 110 attached to the lens barrel 20 being spaced with respect to the focal lens group 112 for focal control attached to the fixed lens barrel 102. Although FIGS. 4 and 5 do not illustrate a zoom mechanism which moves the zoom optical system lenses 110 and 112 in the direction of the optical axis L to adjust a focal length, a desired focal length can be adjusted by moving the zoom optical system lenses 110 and 112 in the use position of FIG. 4 by the zoom mechanism described above. In addition, the focal length may be changed by changing an amount of extension of the lens barrel 20 with a motor (not illustrated) to change the relative position of the zoom optical system lenses 110 and 112.

The lens barrel 20 has a telescopic structure with respect to the fixed lens barrel 102 as described above, and the respective spacings among the zoom lens group 110, the shutter 56, and the focal lens group 112 are shortened when contained as illustrated in FIG. 5. At this time, the entrance window 104 is completely contained in the camera case 12 to be protected from soiling or flaw even without a dedicated barrier. Note that the lens barrel 20 with the telescopic structure is moved to the position of FIG. 4 or 5 by a rack (not illustrated) being formed on the side of the lens barrel 20 and a pinion (not illustrated) which mates with the rack being driven to rotate positively or negatively with a motor (not illustrated).

Next, the image blurring correcting apparatus of the embodiment is described.

Figure 6:
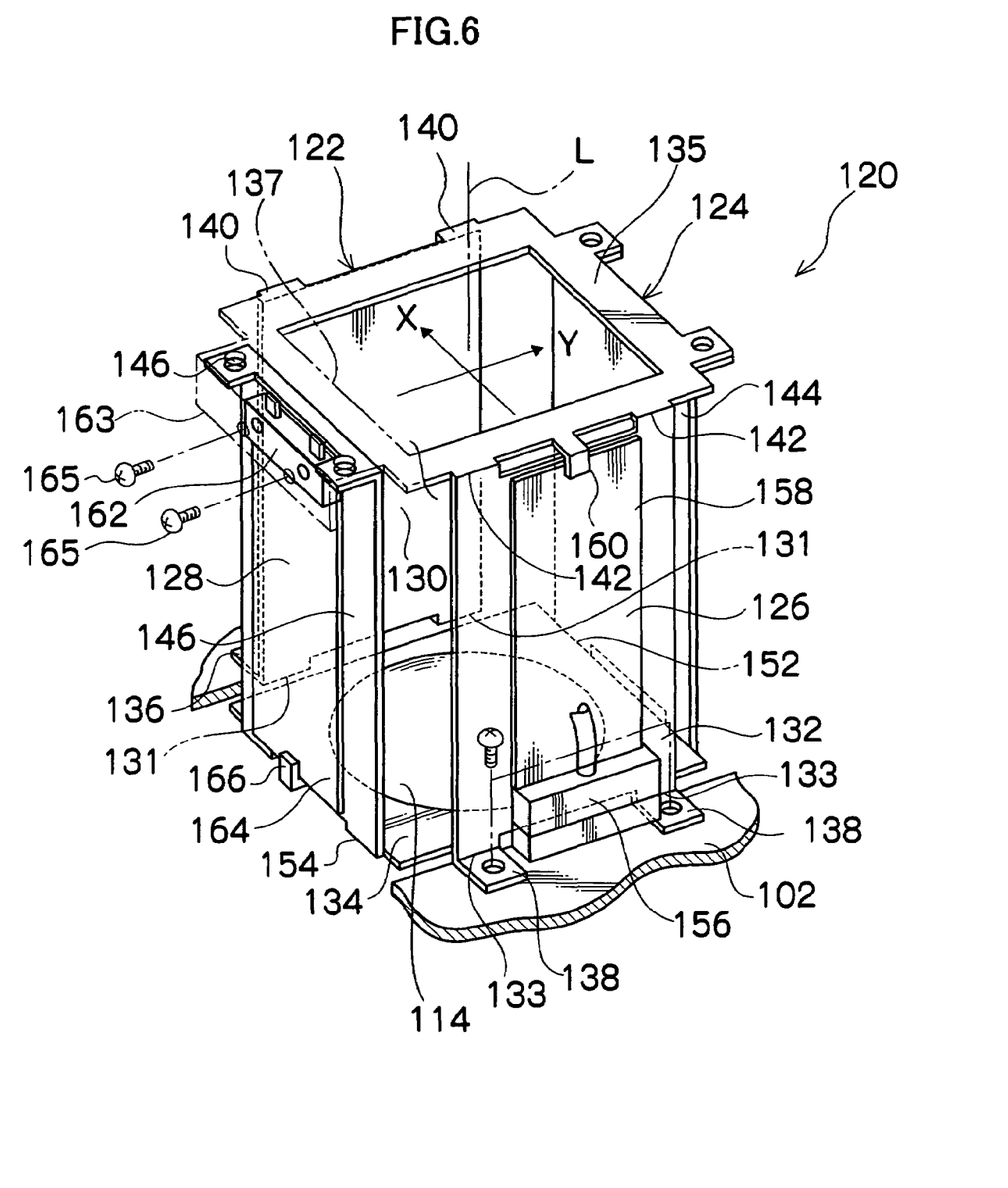
FIG. 6 is a perspective view illustrating a schematic configuration of an image blurring correcting apparatus according to the first embodiment.
Figure 7:
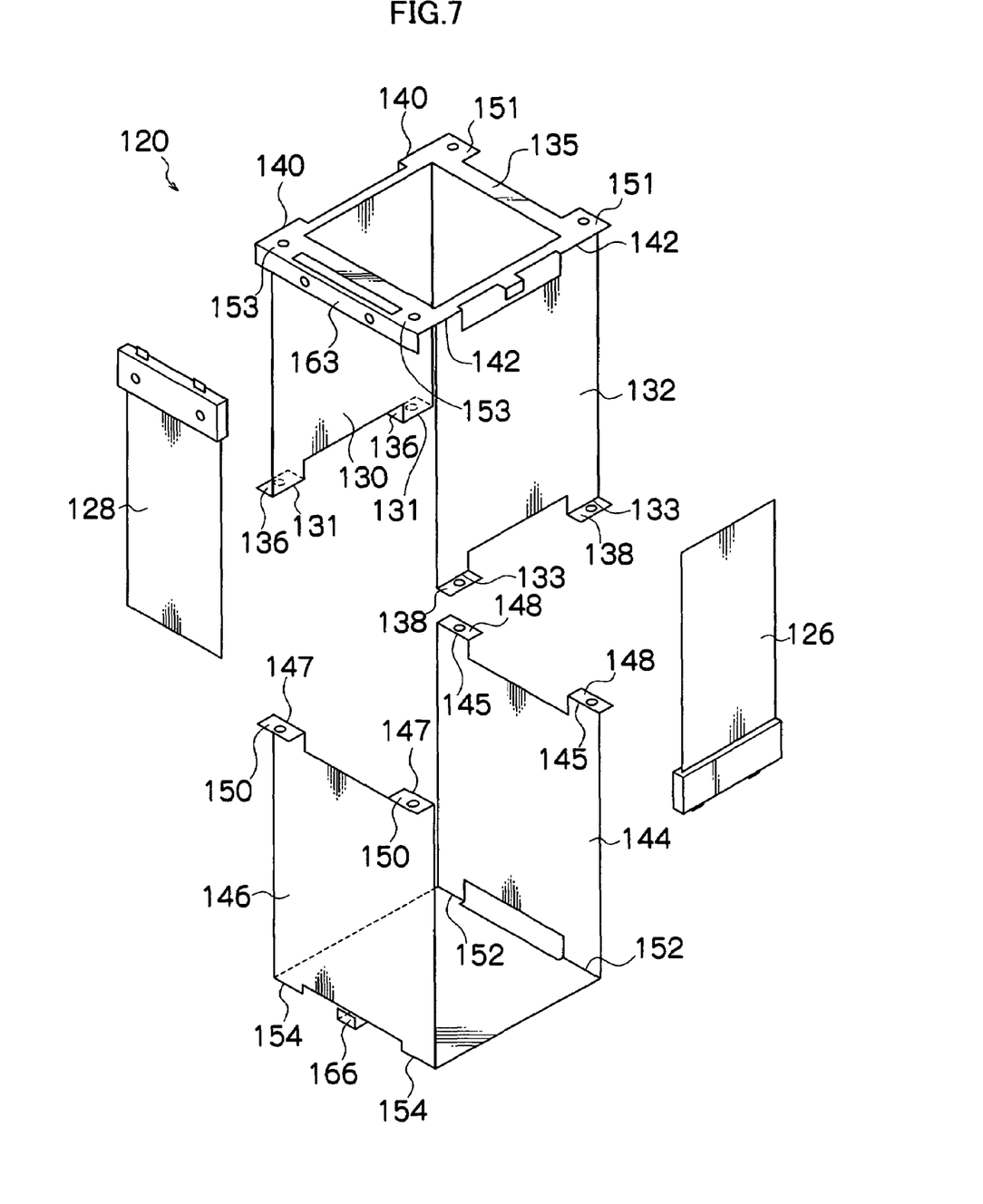
FIG. 7 is an assembling perspective view of the image blurring correcting apparatus illustrated in FIG. 6.

An image blurring correcting apparatus 120 of a first embodiment illustrated in FIGS. 6 and 7 includes two pairs of parallel linkage mechanisms 122 and 124 to move the relay lens 114 parallel and two bimorph piezoelectric actuators 126 and 128.

The parallel linkage mechanism 122 is composed of a pair of resin plates 130 and 132 of the rectangular shape with the equal length, and the resin plates 130 and 132 are arranged opposite to each other via a lens frame 134 of the relay lens 114 formed in the square shape. The resin plates 130 and 132 are disposed in parallel with the imaging optical axis L in the state of non-operation.

At the lower ends of the resin plates 130 and 132, stays 136 and 138 extending outward are formed via hinge sections 131 and 133 used as rotation joints at the fixed side of the parallel linkage mechanism 122. The resin plates 130 and 132 are fixed to the fixed lens barrel 102 via the stays 136 and 138 by a fixture, such as a rivet. While the upper ends of the resin plates 130 and 132 are formed integrally with a middle frame 135 having an opening 137 of the size including the relay lens 114 being formed, hinge sections 140 and 142 are formed at the connecting points so that they become rotation joints at the free side of the parallel linkage mechanism 122. By the parallel linkage mechanism 122 constituted in this manner, the middle frame 135 is supported with free parallel movement in the X direction in the plane perpendicular to the optical axis L.

The parallel linkage mechanism 124 is similarly composed of a pair of resin plates 144 and 146 of the rectangular shape with the length equal to the resin plates 130 and 132, and the resin plates 144 and 146 are arranged opposite to each other via the lens frame 134. The resin plates 144 and 146 are disposed in parallel with the imaging optical axis L in the state of non-operation.

On the upper ends of the resin plates 144 and 146, stays 148 and 150 are formed via hinge sections 145 and 147 which serve as the rotation joints at the fixed side of the parallel linkage mechanism 124, as illustrated in FIG. 7. The stays 148 and 150 are connected with the stays 151 and 153 formed in the middle frame 135 with a non-illustrated rivet. While the lower ends of the resin plates 144 and 146 are formed integrally with the lens frame 134, hinge sections 152 and 154 are formed at the connecting points so that they may become the rotation joints at the free side of the parallel linkage mechanism 124. By the parallel linkage mechanism 124 constituted in this manner, the relay lens 114 is supported with free parallel movement in the Y direction in the plane perpendicular to the imaging optical axis L. Therefore, since the relay lens 114 is moved in the X direction via the parallel linkage mechanism 124 by the middle frame 135 being moved in the X direction, the relay lens 114 is moved in the X and Y directions as a result.

Meanwhile, the bimorph piezoelectric actuator 126 illustrated in FIG. 6 is constituted by pasting thin sheets of piezoelectric ceramics together via a metal plate of an electrode, and is configured so as to apply the + voltage and the − voltage to the respective electrodes. While the bimorph piezoelectric actuator 126 is arranged in parallel with the resin plate 132 of the parallel linkage mechanism 122, a fixed end 156 of the bimorph piezoelectric actuator 126 is fixed to the fixed lens barrel 102 and a movable end 158 of the bimorph piezoelectric actuator 126 is engaged with a hook 160 which protrudes on the side of the middle frame 135. If a potential is given to the bimorph piezoelectric actuator 126 via a drive circuit 169 from a controller (CPU) 168 of FIG. 8 with such a configuration, the resulting piezoelectric transversal effect expands one sheet and contracts the other so that bending displacement can be obtained. The bending displacement enables to move the relay lens 114 parallel in the X direction via the middle frame 135 as illustrated in FIGS. 9A and 9B. Since the lens frame 134 is held by the parallel linkage mechanism 122 at this time, an a amount of the parallel movement is obtained in the X direction of the plane perpendicular to the imaging optical axis L without being inclined with respect to the imaging optical axis L, as illustrated in FIG. 9B.

Figure 10A:
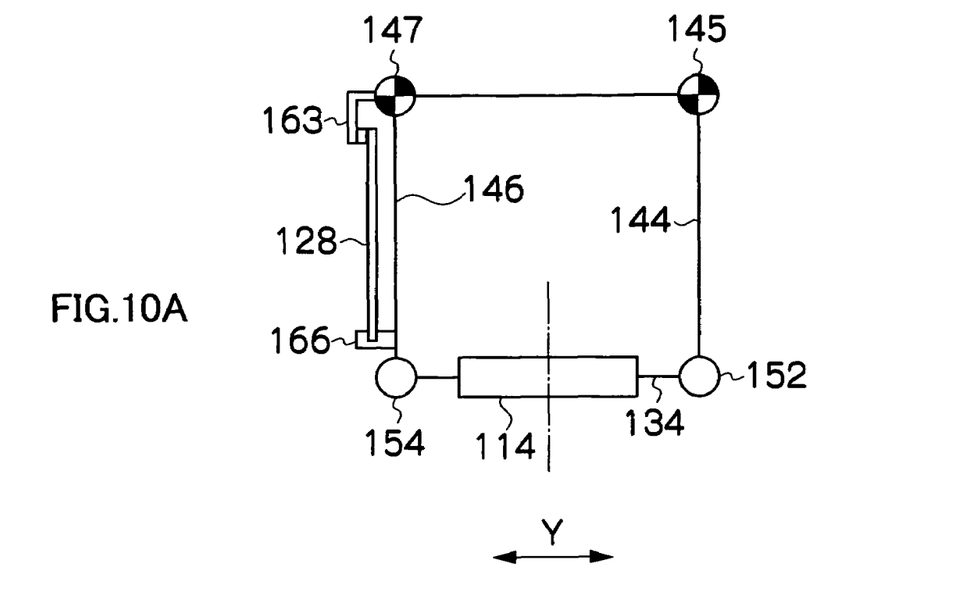
FIGS. 10A and 10B are diagrams schematically illustrating the movement in the Y direction of the image blurring correcting apparatus illustrated in FIG. 6.
Figure 10B:
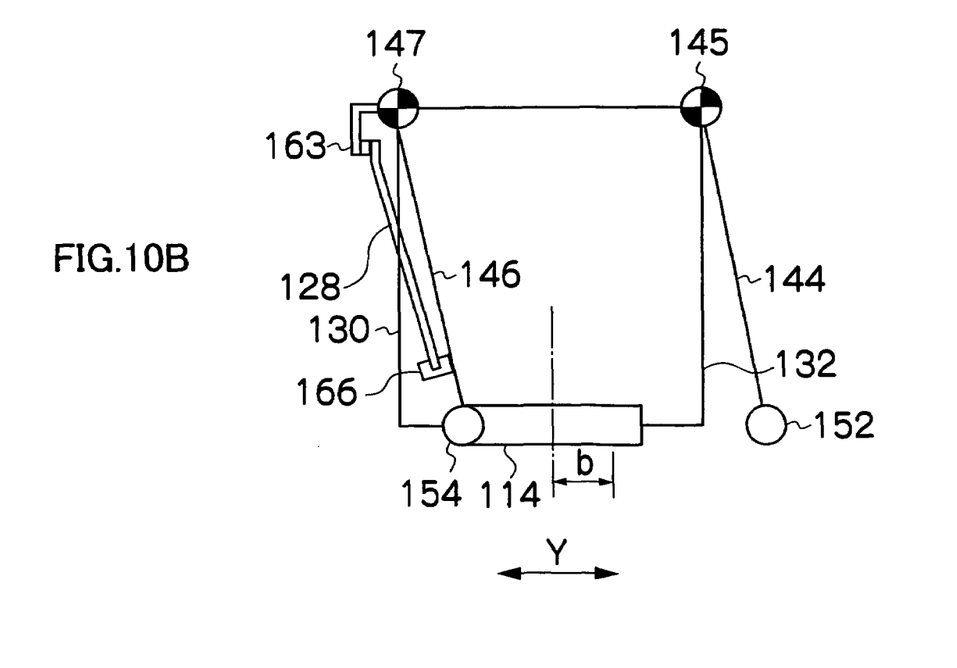

The bimorph type piezoelectric actuator 128 is similarly constituted by pasting the thin sheets of the piezoelectric ceramics together via the metal plate of the electrode. While the bimorph piezoelectric actuator 128 is arranged in parallel with the resin plate 146 of the parallel linkage mechanism 124, a fixed end 162 of the bimorph piezoelectric actuator 128 is fixed to a stay 163 of the middle frame 135 with a screw 165 and a movable end 164 of the bimorph piezoelectric actuator 128 is engaged with a hook 166 which protrudes on the side of the lens frame 134, as illustrated in FIG. 6. If the potential is given to the bimorph piezoelectric actuator 128 via the drive circuit 169 from the controller 168 of FIG. 6 with such a configuration, the resulting piezoelectric transversal effect expands one sheet and contracts the other so that the bending displacement can be obtained. The bending displacement enables to move the relay lens 114 parallel in the Y direction via the middle frame 135 as illustrated in FIGS. 10A and 10B. Since the lens frame 134 is held by the parallel linkage mechanism 124 at this time, a b amount of the parallel movement is obtained in the Y direction of the plane perpendicular to the imaging optical axis L without being inclined to the imaging optical axis L, as illustrated in FIG. 10B.

Figure 8:
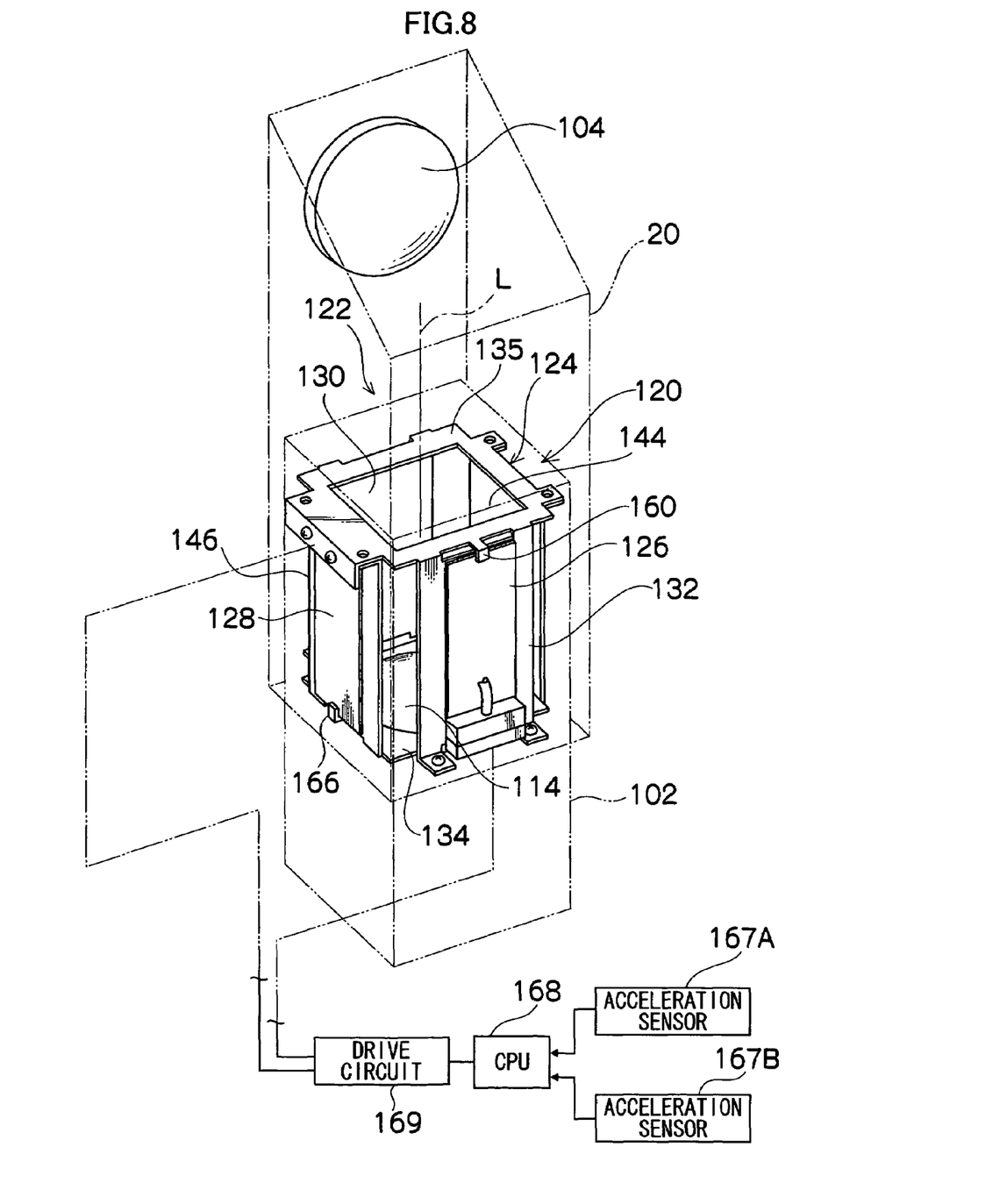
FIG. 8 is a perspective view illustrating a principal part configuration of the image blurring correcting apparatus illustrated in FIG. 6.
Figure 9A:
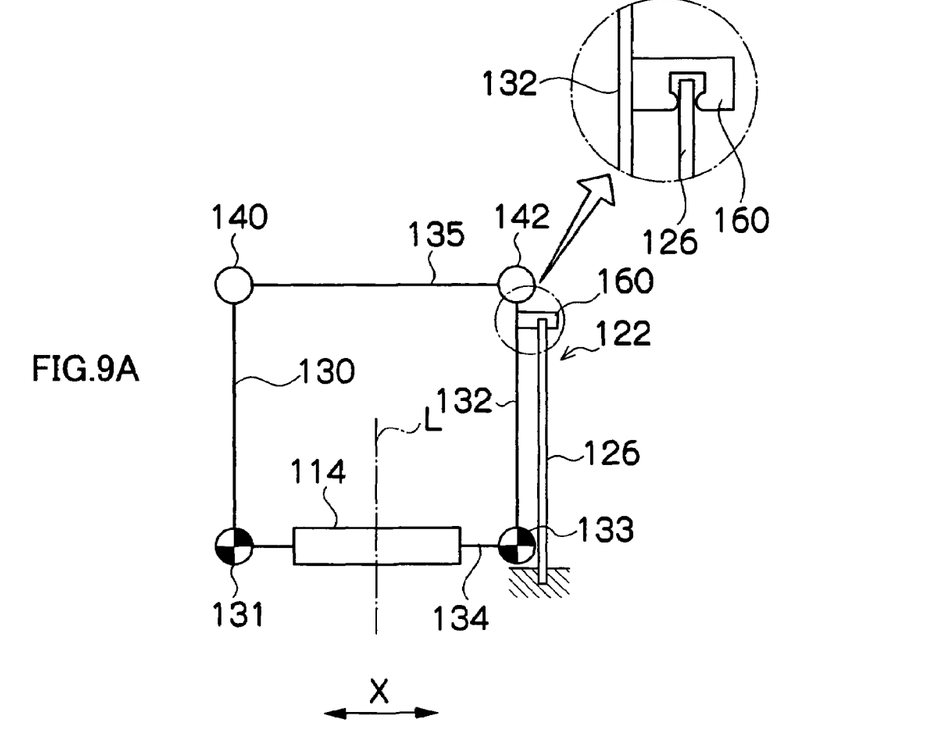
FIGS. 9A and 9B are diagrams schematically illustrating a movement in the X direction of the image blurring correcting apparatus illustrated in FIG. 6.
Figure 9B:
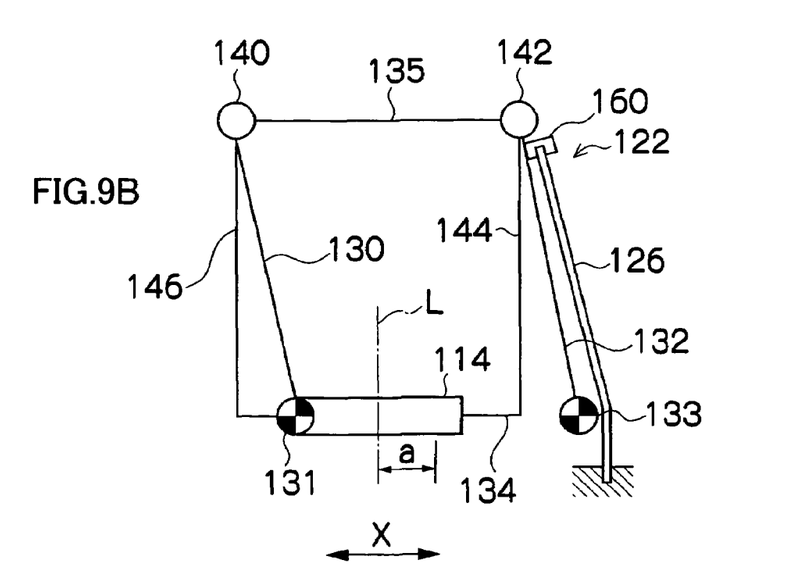

As illustrated in FIG. 8, detection sensors (for example, acceleration sensor) 167A and 167B which detect the deflection in the X and Y directions are built in the digital camera 10. The controller 168 described above controls the drive circuit 169 so as to apply the voltage to move the relay lens 114 by the amount of deflection in the direction opposite to the deflection direction to the bimorph piezoelectric actuator 126 and 128 to compensate the movement due to the deflection of the digital camera 10 acquired by the detection output from these deflection detection sensors 167A and 167B.

According to the image blurring correcting apparatus 120 of the first embodiment illustrated in FIGS. 6 to 10, the bimorph piezoelectric actuators 126 and 128 are in the plate form and disposed along the imaging optical axis L, the space for disposition in the fixed lens barrel 102 can be reduced, allowing to contribute to the miniaturization of the fixed lens barrel 102. Thereby, according to the digital camera 10 having the bending optical system, even when the image blurring correcting apparatus 120 is built into their imaging optical system, the camera case 12 can be made thinner.

In addition, since the bimorph piezoelectric actuators 126 and 128 are superior to the other actuators in terms of displacement precision, generative force, and a speed of response, they are suitable as the actuator of the image blurring correcting apparatus 120 which requires high precision and quick response.

Although the bimorph piezoelectric actuators 126 and 128 are explained as the driving force generating device, the driving force generating device which is able to transform electrical energy into mechanical energy can be applied. Moreover, a bimetal and a shape memory alloy may be applied.

FIG. 9 illustrates an image blurring correcting apparatus 170 of a second embodiment.

Figure 11:
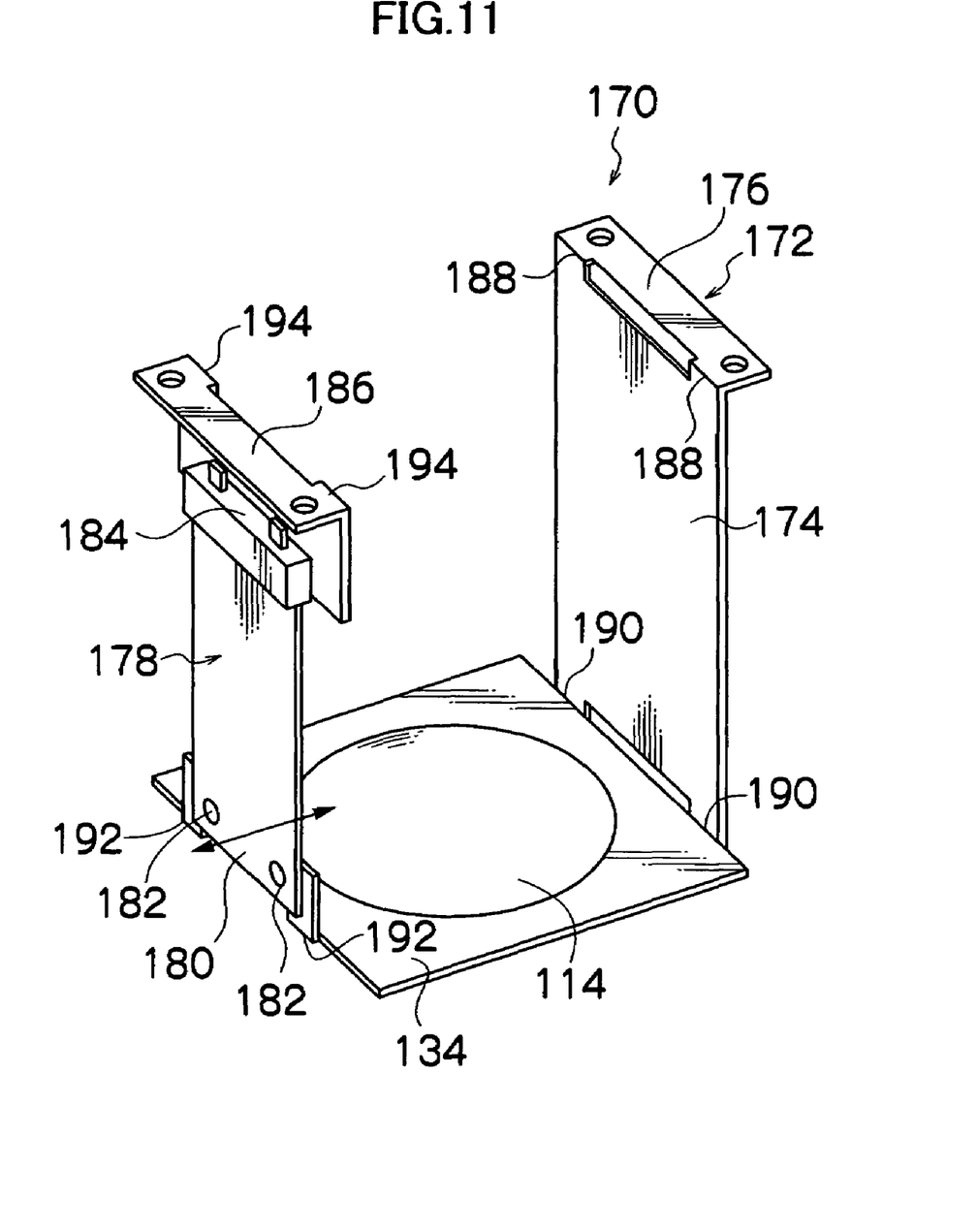
FIG. 11 is a perspective view illustrating the schematic configuration of the image blurring correcting apparatus according to the second embodiment.

A resin plate 174 of a parallel linkage mechanism 172 is provided integrally with the lens frame 134, and is attached to the non-illustrated lens-barrel via a stay 176. In addition, a movable end 180 of a bimorph piezoelectric actuator 178 is connected to the lens frame 134 with rivets 182 and 182, while a stay 186 is fixed to a fixed end 184 of the bimorph piezoelectric actuator 178 with the non-illustrated rivet. Since the bimorph piezoelectric actuator 178 is arranged opposite to the resin plate 174 via the lens frame 134 and fixed to the lens barrel via the stay 186 as with the resin plate 174, a pair of the parallel linkage mechanisms 172 are constituted of the resin plate 174 and the bimorph piezoelectric actuator 178. If the potential is given to the bimorph piezoelectric actuator 178 with such a configuration, the movable end 180 of the bimorph piezoelectric actuator 178 is deflected as indicated by an arrow, so that the relay lens 114 can be moved parallel in the plane perpendicular to the imaging optical axis L. By providing a pair of the parallel linkage mechanism 172 in the perpendicular direction of two axes, the relay lens 114 can be moved in the plane perpendicular to the imaging optical axis, allowing to correct the image blurring. Reference numerals 188, 190, 192, and 194 designate the rotation joints of the parallel linkage mechanism 172.

Since the bimorph piezoelectric actuator is rigid in the state where the electric potential is not given, it can be utilized in an ordinary camera where the imaging optical axis coincides with the width direction of the camera case (including a lens-barrel-collapsible camera and a lens-exchangeable camera) as a device which holds the correcting optical system thereof while the power is OFF. Suitably, the potential is given to the bimorph piezoelectric actuator just before turning off the power supply of the camera, the correcting optical system is held slightly upward with respect to the imaging optical axis against gravity, and the power supply is turned off in this state. Thereby, a spring member becomes unnecessary for hanging the correcting optical system from the lens barrel to support it aside from the driving force generating device of the correcting optical system.

Figure 12:
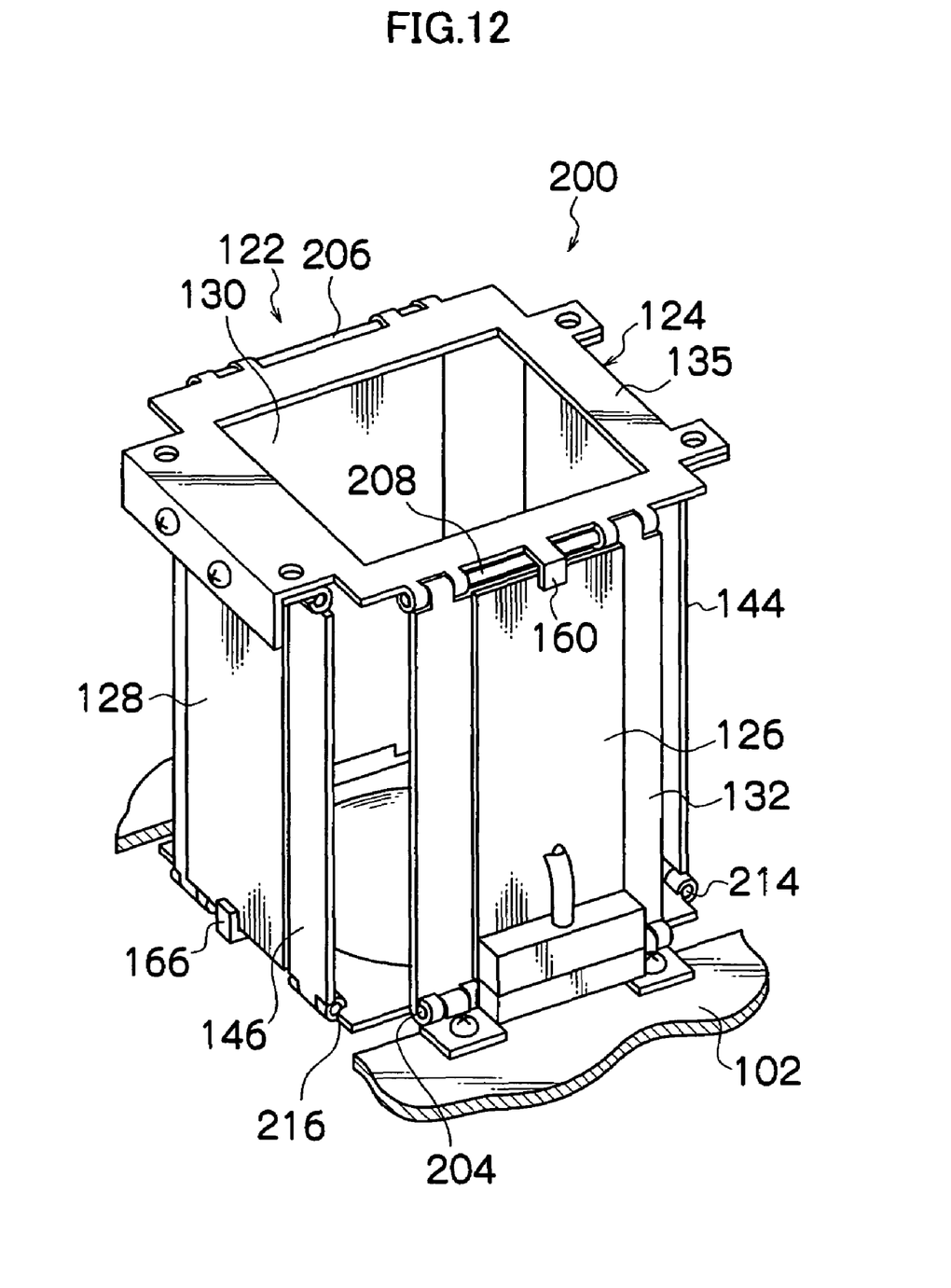
FIG. 12 is a perspective view illustrating the schematic configuration of the image blurring correcting apparatus according to the third embodiment.
Figure 13:
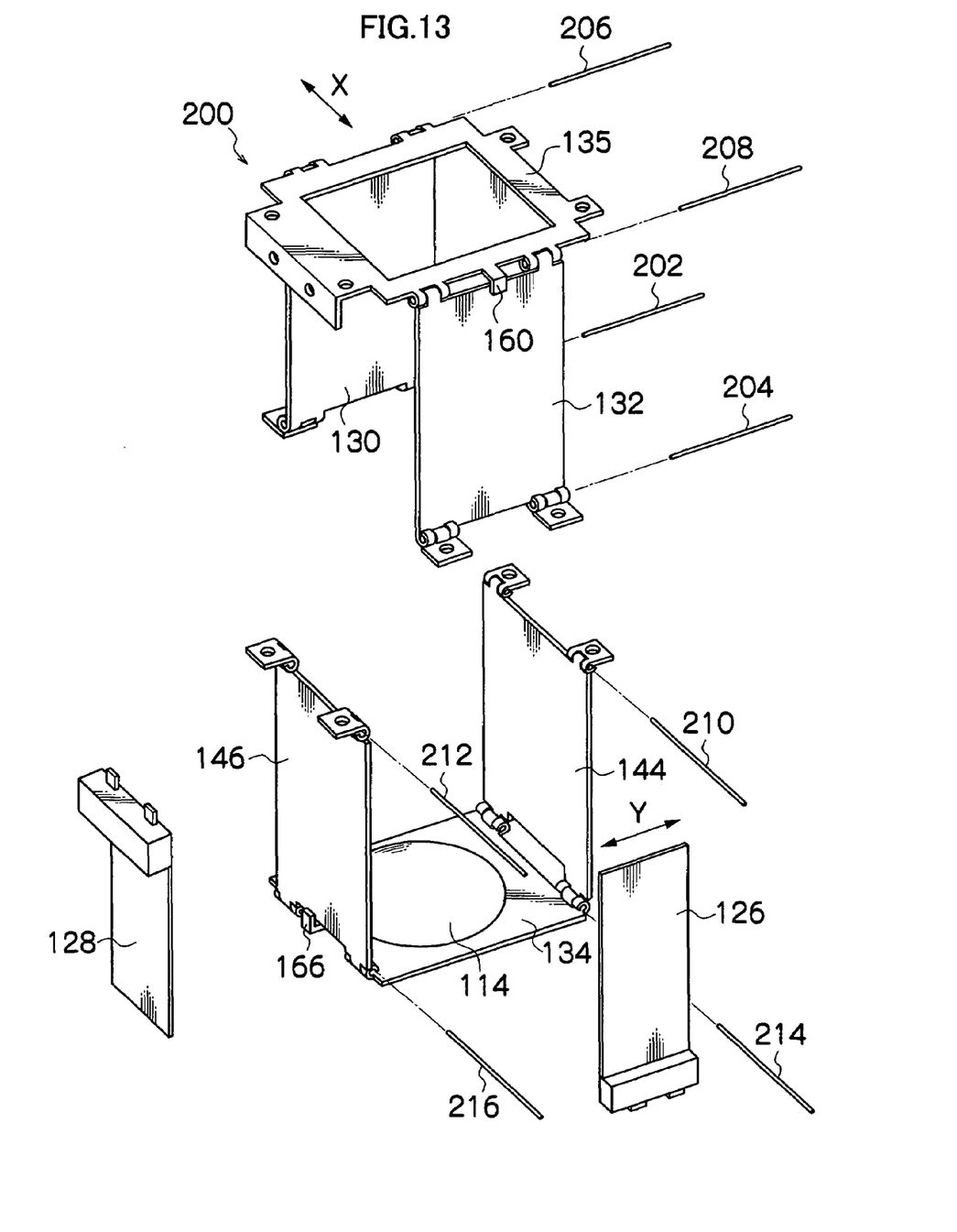
FIG. 13 is an assembling perspective view of the image blurring correcting apparatus illustrated in FIG. 12.

FIGS. 12 and 13 illustrate an image blurring correcting apparatus 200 of the second embodiment, wherein the same reference numerals are given to the same or similar members with the image blurring correcting apparatus 120 illustrated in FIGS. 6 and 7 and the description thereof is omitted.

The image blurring correcting apparatus 200 has a structure which uses eight pins 202, 204, 206, 208, 210, 212, 214, and 216 as the rotation joints of the parallel linkage mechanism.

In other words, the lower ends of the resin plates 130 and 132 of the parallel linkage mechanism 122 are fixed rotatably to the fixed lens barrel 102 via the pins 202 and 204 used as the rotation joints at the fixed side of the parallel linkage mechanism 122. The upper ends of the resin plates 130 and 132 are connected rotatably with the middle frame 135 via the pins 206 and 208 used as the rotation joints at the free side of the parallel linkage mechanism 122. By the parallel linkage mechanism 122 constituted in this manner, the middle frame 135 is supported with free parallel movement in the X direction in the plane perpendicular to the optical axis L.

The parallel linkage mechanism 124 is similarly configured so that the upper ends of the resin plates 144 and 146 are connected rotatably with the middle frame 135 via the pins 210 and 212 used as the rotation joints at the fixed side of the parallel linkage mechanism 124. In addition, the lower ends of the resin plates 144 and 146 are connected rotatably with the lens frame 134 via the pins 214 and 216 used as the rotation joints at the free side of the parallel linkage mechanism 124. By the parallel linkage mechanism 124 constituted in this manner, the relay lens 114 is supported with free parallel movement in the Y direction in the plane perpendicular to the imaging optical axis L. Therefore, since the relay lens 114 is moved in the X direction via the parallel linkage mechanism 124 by the middle frame 135 being moved in the X direction, the relay lens 114 is moved parallel in the X and Y directions as a result.

What is claimed is:

1. An image blurring correcting apparatus comprising:
   a correcting optical system which corrects image blurring;
   a parallel link member which is arranged in parallel with an imaging optical axis and supports the correcting optical system with free parallel movement in the direction perpendicular to the imaging optical axis; and
   a driving force generating device with one end being fixed to a fixed part of the parallel link member and a movable end on the other end being connected to the correcting optical system,
   wherein the driving force generating device is driven to move the correcting optical system parallel in the direction perpendicular to the imaging optical axis by the parallel link member so as to correct the image blurring.

2. The image blurring correcting apparatus according to claim 1, wherein
   the driving force generating device is a bimorph piezoelectric actuator.

3. An imaging apparatus comprising the image blurring correcting apparatus according to claim 1.

4. An imaging apparatus comprising the image blurring correcting apparatus according to claim 2.

* * * * *